United States Patent
Han

(10) Patent No.: US 11,038,845 B2
(45) Date of Patent: Jun. 15, 2021

(54) FIREWALL IN A VIRTUALIZED COMPUTING ENVIRONMENT USING PHYSICAL NETWORK INTERFACE CONTROLLER (PNIC) LEVEL FIREWALL RULES

(71) Applicant: NICIRA, INC., Palo Alto, CA (US)

(72) Inventor: Donghai Han, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 774 days.

(21) Appl. No.: 15/050,477

(22) Filed: Feb. 23, 2016

(65) Prior Publication Data

US 2017/0244673 A1 Aug. 24, 2017

(51) Int. Cl.
*H04L 29/06* (2006.01)

(52) U.S. Cl.
CPC ...... *H04L 63/0263* (2013.01); *H04L 63/0227* (2013.01); *H04L 63/0236* (2013.01); *H04L 63/0254* (2013.01)

(58) Field of Classification Search
CPC ............. H04L 63/0263; H04L 63/0227; H04L 63/0236; H04L 63/0254
See application file for complete search history.

(56) References Cited

U.S. PATENT DOCUMENTS

| | | | |
|---|---|---|---|
| 7,853,998 B2 | 12/2010 | Blaisdell et al. | |
| 9,148,895 B2 | 9/2015 | PalChaudhuri et al. | |
| 9,325,739 B1 | 4/2016 | Roth et al. | |
| 9,380,027 B1 | 6/2016 | Lian et al. | |
| 9,621,516 B2 | 4/2017 | Basak et al. | |
| 9,634,990 B2 * | 4/2017 | Lee | H04L 63/20 |
| 9,755,903 B2 * | 9/2017 | Masurekar | H04L 67/1095 |
| 9,806,948 B2 * | 10/2017 | Masurekar | G06F 16/25 |
| 10,873,566 B2 | 12/2020 | Han | |
| 2003/0097589 A1 | 5/2003 | Syvanne | |
| 2007/0056038 A1 | 3/2007 | Lok | |
| 2008/0163207 A1 * | 7/2008 | Reumann | H04L 63/101 718/1 |
| 2009/0249472 A1 * | 10/2009 | Litvin | H04L 63/0263 726/14 |
| 2012/0207174 A1 | 8/2012 | Shieh | |
| 2012/0290703 A1 * | 11/2012 | Barabash | H04L 63/20 709/223 |

(Continued)

*Primary Examiner* — James R Turchen
(74) *Attorney, Agent, or Firm* — Adeli LLP

(57) ABSTRACT

Example methods are provided for a destination host to implement a firewall in a virtualized computing environment that includes the destination host and a source host. The method may comprise receiving, via a physical network interface controller (PNIC) of the destination host, an ingress packet sent by the source host. The ingress packet may be destined for a destination virtualized computing instance that is supported by the destination host and associated with a destination virtual network interface controller (VNIC). The method may further comprise retrieving a PNIC-level firewall rule associated with the destination virtualized computing instance, the PNIC-level firewall rule being applicable at the PNIC and generated by based on a VNIC-level firewall rule applicable at the destination VNIC. In response to determination that the PNIC-level firewall rule blocks the ingress packet from passing through, the ingress packet may be dropped such that the ingress packet is not sent to the destination VNIC.

18 Claims, 7 Drawing Sheets

(56) References Cited

U.S. PATENT DOCUMENTS

| | | |
|---|---|---|
| 2013/0125230 A1 | 5/2013 | Koponen et al. |
| 2014/0164595 A1 | 6/2014 | Bray et al. |
| 2014/0195666 A1* | 7/2014 | Dumitriu ............... H04L 49/70 709/223 |
| 2014/0245423 A1* | 8/2014 | Lee ................... H04L 63/0218 726/12 |
| 2014/0376367 A1 | 12/2014 | Jain et al. |
| 2015/0082417 A1* | 3/2015 | Bhagwat ............ H04L 63/0263 726/13 |
| 2015/0237013 A1* | 8/2015 | Bansal ................... H04L 63/02 726/13 |
| 2015/0281178 A1* | 10/2015 | Raman ............... H04L 63/0227 726/13 |
| 2015/0281179 A1* | 10/2015 | Raman ............... H04L 63/0272 726/11 |
| 2015/0358290 A1* | 12/2015 | Jain ........................ H04L 69/22 711/108 |
| 2016/0156591 A1* | 6/2016 | Zhou .................. H04L 63/0263 726/13 |
| 2016/0239330 A1 | 8/2016 | Bride et al. |
| 2016/0294858 A1 | 10/2016 | Woolward et al. |
| 2017/0005986 A1* | 1/2017 | Bansal ............... H04L 63/0218 |
| 2017/0104790 A1 | 4/2017 | Meyers et al. |
| 2017/0118173 A1 | 4/2017 | Arramreddy et al. |
| 2017/0134433 A1 | 5/2017 | Hugenbruch et al. |
| 2017/0180414 A1 | 6/2017 | Andrews et al. |
| 2017/0187679 A1 | 6/2017 | Basak et al. |
| 2017/0195454 A1 | 7/2017 | Shieh |
| 2017/0208100 A1 | 7/2017 | Lian et al. |
| 2017/0244671 A1 | 8/2017 | Kamalakantha et al. |
| 2017/0244674 A1 | 8/2017 | Han |
| 2017/0264622 A1 | 9/2017 | Cooper et al. |

\* cited by examiner

610

Destination-associated firewall rules for VM4

| Src IP | Src PN | Dest IP | Dest PN | Protocol | Action |   |
|---|---|---|---|---|---|---|
| Any | Any | IP-VM1 | ≠ 80 | TCP | DROP | ~ 612 |
| Any | Any | Any | Any | Any | PASS | ~ 614 |

620

Destination-associated firewall rules for VM5

| Src IP | Src PN | Dest IP | Dest PN | Protocol | Action |   |
|---|---|---|---|---|---|---|
| Any | Any | IP-VM2 | ≠ 80 | TCP | DROP | ~ 622 |
| Any | Any | Any | Any | Any | PASS | ~ 624 |

Destination-associated firewall rules for VM4, VM5

| Src IP | Src PN | Dest IP | Dest PN | Protocol | Action |   |
|---|---|---|---|---|---|---|
| Any | Any | IP-VM1, IP-VM2 | 80 | TCP | PASS | ~ 632 |
| Any | Any | IP-VM3 | 443 | TCP | PASS | ~ 634 |
| Any | Any | IP-VM1, IP-VM2, IP-VM3 | Any | Any | DROP | ~ 636 |

Fig. 6B

FIREWALL IN A VIRTUALIZED COMPUTING ENVIRONMENT USING PHYSICAL NETWORK INTERFACE CONTROLLER (PNIC) LEVEL FIREWALL RULES

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Datacenter (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. Virtualization software (e.g., hypervisor) running on the physical machine is generally used to maintain a mapping between the virtual resources allocated to each virtual machine and the underlying physical resources of the host.

In order to meet new requirements of granularity and scalability in the virtualized computing environment, a firewall engine is deployed on each hypervisor to protect the virtual machines. A central firewall controller is used to control all firewall engines and distribute firewall rules to them based on any suitable security policy. However, conventional firewall rules may not be optimal to the performance of the hosts or a network via which the hosts communicate.

BRIEF DESCRIPTION OF DRAWINGS

FIG. 6A is a schematic diagram illustrating example destination-associated firewall rules generated based on VNIC-level firewall rules;

FIG. 6B is a schematic diagram illustrating example destination-associated firewall rules generated based on PNIC-level firewall rules.

DETAILED DESCRIPTION

Figure 1:
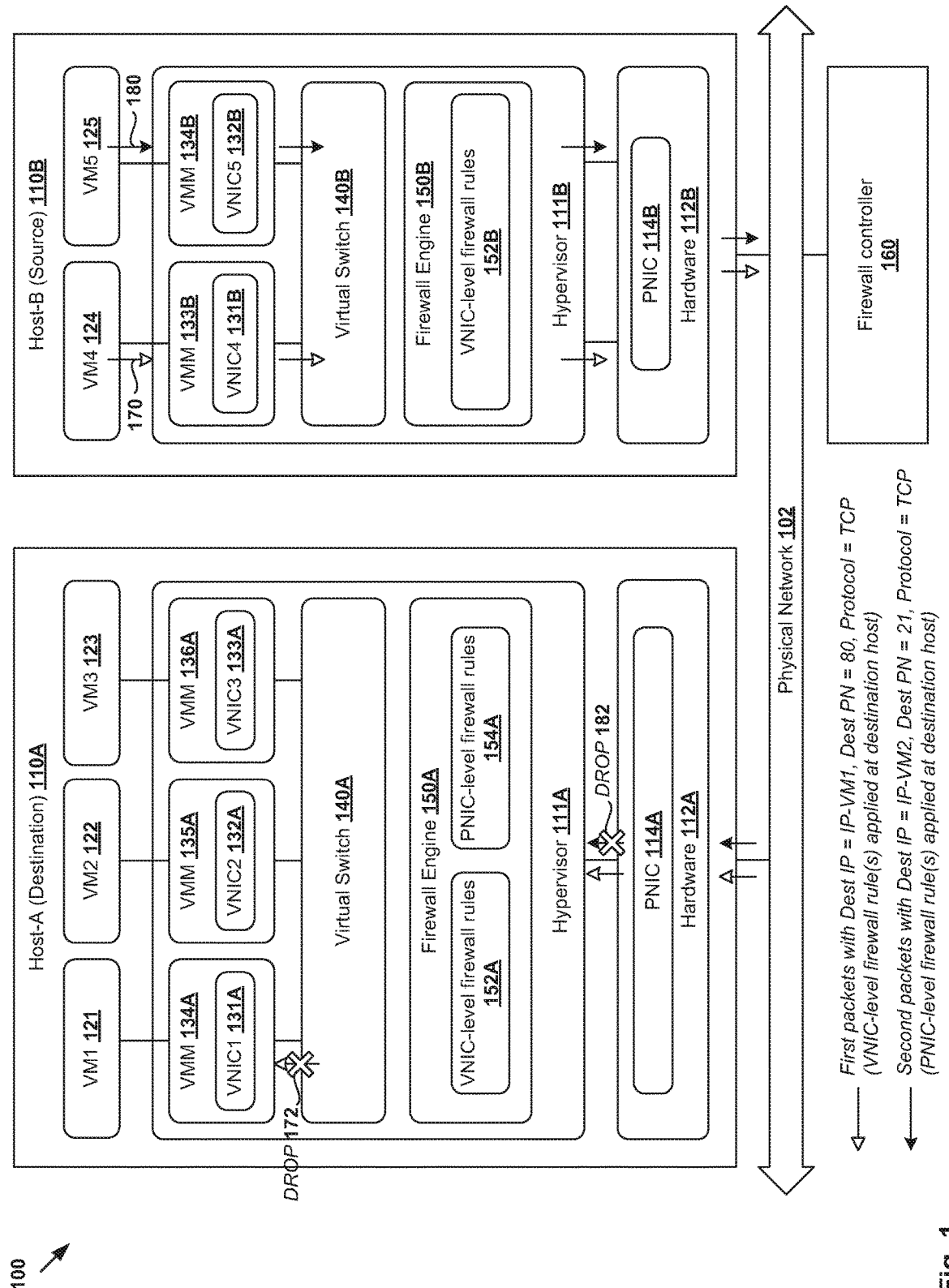
FIG. 1 is a schematic diagram illustrating example virtualized computing environment in which firewall is implemented according to a first example

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The challenges of implementing a firewall, such as a distributed firewall, will be described in more detail with reference to FIG. 1. In particular, FIG. 1 is a schematic diagram illustrating example virtualized computing environment 100 in which firewall is implemented according to a first example. It should be understood that network environment 100 may include additional and/or alternative components than that shown, depending on the desired implementation.

Virtualized computing environment 100 includes multiple hosts (also known as "computing devices", "host computers", "host devices", "physical servers", "server systems", etc.), such as Host-A 110A and Host-B 110B. Each host 110A/110B executes virtualization software (e.g., hypervisor 111A/111B) and includes hardware 112A/112B to support various virtual machines. For example, Host-A 110A supports "VM1" 121, "VM2" 122 and "VM3" 123, while Host-B 110B supports "VM4" 124 and "VM5" 125. Although some hosts and virtual machines are shown for simplicity, there may be any suitable number of hosts, each supporting tens or hundreds of virtual machines in practice.

Hypervisor 111A/111B maintains a mapping between underlying hardware 112A/112B and virtual resources allocated to the virtual machines. For example, hardware 112A/112B includes one or more physical network interface controllers (PNICs) 114A/114B to access physical network 102. Hardware 112A/112B also includes other physical resources (not shown for simplicity), such as Central Processing Unit (CPU), memory (e.g., random access memory), storage disks (e.g., solid state drive, hard disk drive), etc.

"VM1" 121 to "VM5" 125 each represent a software implementation of a physical machine. Although examples of the present disclosure refer to "virtual machines", it should be understood that virtual machines running within a virtualized computing environment are merely one example of "virtualized computing instance" or "workload" that represents an addressable data compute node (DCN), an isolated user space instance, etc. In practice, any suitable technologies aside from hardware virtualization may be used to provide isolated user space instances. For example, other workloads may include containers (e.g., running on top of a host operating system without the need for a hypervisor or separate operating system), physical hosts, client computers, virtual private servers, etc. The virtual machines may also be complete computation environments, containing virtual equivalents of the hardware and system software components of a physical system.

To support guest operating systems and run applications, virtual resources are allocated to the virtual machines. For example, corresponding to hardware 112A/112B, the virtual resources may include virtual CPU, virtual memory, virtual disk, virtual network interface controller (VNIC) to provide network access, etc. Hardware resources may be emulated using virtual machine monitors (VMMs) implemented by hypervisor 111A/111B. For example, at Host-A 110A, "VNIC1" 131A, "VNIC2" 132A and "VNIC3" 133A are emulated by respective VMMs 134A, 135A and 136A. At Host-B 110B, "VNIC4" 131B and "VNIC5" 132B are emulated by respective VMMs 133B, 134B. In practice, the VMMs may be considered as components that are part of respective virtual machines, or alternatively, separated from the virtual machines. Also, one virtual machine may have access to multiple VNICs.

Hypervisor 111A/111B implements virtual switch 140A/140B to handle both egress traffic (i.e., outgoing or outbound) and ingress traffic (i.e., incoming or inbound traffic). Virtual switch 140A/140B is generally a logical collection of virtual ports and maintains forwarding information of VNIC addresses to forward packets to and from the VNICs. Each VNIC may be logically associated with a virtual port (not shown for simplicity) maintained by virtual switch 140A/140B to facilitate packet forwarding. As used herein, the term "packets" may refer generally to a group of bits that can be transported together from a source to a destination, such as "segments," "frames," "messages," "datagrams," etc.

Virtual switch 140A/140B is connected to PNIC 114A/114B (e.g., via a NIC driver) to send egress packets to, and receive ingress packets, from physical network 102. For example, at source Host-B 110B, virtual switch 140B handles egress packets originating from "VM4" 124 and "VM5" 125. Egress packets destined for Host-A 110A (or any external entity) are forwarded by virtual switch 140B to physical network 102 via PNIC 114B. When received by the destination, those packets are taken as ingress packets from the perspective of Host-A 110A. Virtual switch 140A receives the ingress packets via PNIC 114A from physical network 102 for forwarding to "VM1" 121 (via "VNIC1" 131A), "VM2" 122 (via "VNIC2" 132A) or "VM3" 123 (via "VNIC3" 133A).

To protect host 110A/110B against security threats caused by unwanted packets, a firewall is implemented to filter packets to and from the virtual machines. More particularly, a distributed firewall is implemented using multiple distributed (or local) firewall engines 150A and 150B at respective Host-A 110A and Host-B 110B. For example, at Host-A 110A, hypervisor 111A implements firewall engine 150A to filter packets for "VM1" 121, "VM2" 122 and "VM3" 123. At Host-B 110B, hypervisor 111B implements firewall engine 150B to filter packets for "VM4" 124 and "VM5" 125. Firewall engines 150A and 150B are configurable by centralized management entity in the form of firewall controller 160. In particular, firewall controller 160 sends control messages to firewall engines 150A and 150B to apply firewall rules (e.g., configured based on inputs from users).

Conventionally, firewall engine 150A/150B is configured to enforce VNIC-level firewall rules 152A/152B. As used herein, the term "VNIC-level firewall rules" may refer generally to a set of firewall rules that are applicable to packets detected at or received via a particular virtual machine's VNIC (or associated virtual port maintained by corresponding virtual switch). For example, at Host-A 110A, three sets of VNIC-level firewall rules 152A may be applied at respective "VNIC1" 131A, "VNIC2" 132A and "VNIC3" 133A. Upon detecting egress packets sent by "VM1" 121 at "VNIC1" 131A, firewall engine 150A enforces VNIC-level firewall rules 152A associated with "VNIC1" 131A to allow or drop the egress packets. If dropped, this prevents the egress packets from being forwarded to virtual switch 140A and then to PNIC 114A.

However, for ingress packets that arrive at Host-A 110A, applying VNIC-level firewall rules 152A may not be optimal for host performance. Using "VM1" 121 as an example again, consider source "VM4" 124 at Host-B 110B sending packets to destination "VM1" 121 at Host-A 110A via physical network 102. See 170 in FIG. 1. At Host-A 110A, virtual switch 140A receives the (ingress) packets via PNIC 114A and forwards them to destination "VM1" 121 via "VNIC1" 131A. Firewall engine 150A enforces VNIC-level firewall rules 152A associated with "VNIC1" 131A to allow or drop the ingress packets. For example, at 172 in FIG. 1, the ingress packets are dropped.

Although "VM1" 121 is protected from unwanted ingress packets, the application of VNIC-level firewall rules 152A as explained above is inefficient and wastes valuable computing resources of Host-A 110A. In particular, although the ingress packets are eventually dropped, computing resources are used by virtual switch 140A to route the ingress packets to "VNIC1" 131A before VNIC-level firewall rules 152A are applied. This creates significant burden on virtual switch 140A when there is a large number of ingress packets.

PNIC-Level Firewall Rules

According to a first example of the present disclosure, instead of using VNIC-level firewall rules 152A, PNIC-level firewall rules 154A are applied to reduce processing overhead and improve host performance. As used herein, the term "PNIC-level firewall rules" may refer generally to a set of firewall rules that are applicable to packets detected at or received via a particular PNIC. For example in FIG. 1, PNIC-level firewall rules 154A are generated from VNIC-level firewall rules 152A applicable at "VNIC1" 131A, "VNIC2" 132A and "VNIC3" 133A, for application on ingress packets received at PNIC 114A.

Using "VM2" 122 in FIG. 1 as an example, consider "VM5" 125 at source Host-B 110B sending packets to "VM2" 122 at destination Host-A 110A. See 180 in FIG. 1. At Host-A 110A, instead of applying VNIC-level firewall rules 152A at "VNIC2" 132A, the forwarding of the packets is terminated at PNIC 154A. As shown at 182 in FIG. 1, upon detecting the ingress packets at PNIC 114A, firewall engine 150A applies PNIC-level firewall rules 154A to drop the ingress packets. Since PNIC-level firewall rules 154A are applied prior to forwarding the ingress packets to virtual switch 140A and "VNIC2" 132A, it is not necessary for virtual switch 140A to waste computing resources to process the ingress packets and route them through to "VNIC2" 132A (where they will be eventually dropped).

Figure 2:
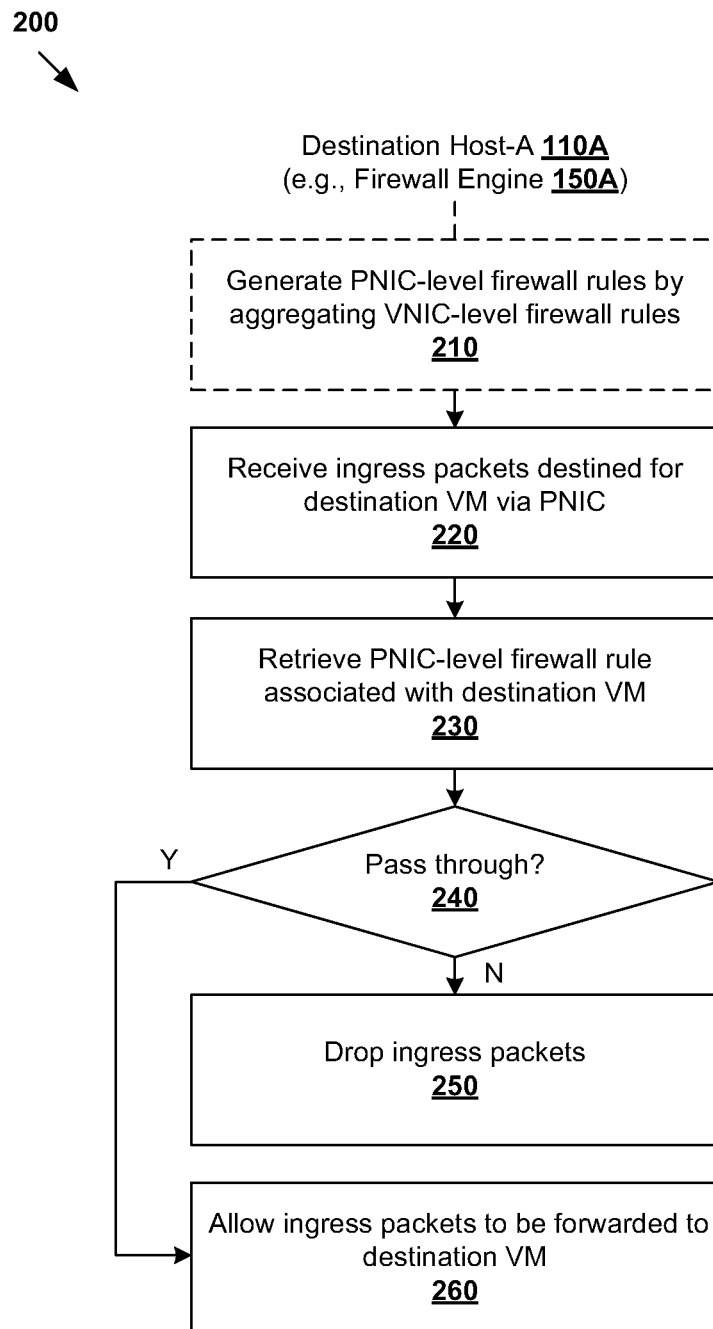
FIG. 2 is a flowchart of example process for a destination host to implement a firewall in a virtualized computing environment.

In more detail, FIG. 2 is a flowchart of example process 200 for a destination host to implement a firewall in a virtualized computing environment. Example process 200 may include one or more operations, functions, or actions illustrated by one or more blocks, such as 210 to 260. The various blocks may be combined into fewer blocks, divided into additional blocks, and/or eliminated depending on the desired implementation. The following will be explained using source "VM5" 125 at Host-B 110B to destination "VM2" 122 at Host-A 110A. Block 210 is shown in dotted line to indicate that it may be performed by firewall engine 150A, firewall controller 160 or any other suitable component not shown in FIG. 1.

At 210 in FIG. 2, PNIC-level firewall rules 154A are generated based on multiple VNIC-level firewall rules 152A associated with "VNIC1" 131A, "VNIC2" 132A and "VNIC3" 133A. As will be described further using FIG. 3, PNIC-level firewall rules 154A may be generated by firewall engine 150A at Host-A 110A. Alternatively or additionally, PNIC-level firewall rules 154A may be generated by firewall controller 160, and distributed to firewall engine 150A at Host-A 110A using control messages. In the example in FIG.

3, PNIC-level firewall rules 154A are generated by aggregating VNIC-level firewall rules 152A.

At 220 in FIG. 2, Host-A 110A receives ingress packets via PNIC 114A. For example, the ingress packets are sent by "VMS" 125 at source Host-B 110B and destined for "VM2" 122 at destination Host-A 110A.

At 230 in FIG. 2, firewall engine 150A retrieves PNIC-level firewall rules 154A associated with destination "VM2" 122. PNIC-level firewall rules 154A are applicable at PNIC 114A and generated based on a VNIC-level firewall rule applicable at "VNIC2" 132A associated with destination "VM2" 122.

At 240 and 250 in FIG. 2, in response to determination that PNIC-level firewall rules 154A block the ingress packets from passing through, firewall engine 150A drops the ingress packets (see 182 in FIG. 1) at PNIC 114A. Otherwise, at 240 and 260 in FIG. 2, in response to determination that the ingress packets are allowed to pass through by PNIC-level firewall rules 154A, firewall engine 150A allows the ingress packets to be forwarded to "VM2" 122 via associated "VNIC2" 132A.

Although not shown in FIG. 1, example process 200 may be implemented also be implemented by Host-B 110B for ingress packets destined for "VM4" 124 or "VM5" 125. In this case, PNIC-level firewall rules may be generated based on (e.g., by aggregating) multiple sets of VNIC-level firewall rules configured for respective "VNIC4" 131B and "VNIC5" 132B, and applied to ingress packets from Host-A 110A, etc. Although FIG. 1 illustrates the application of VNIC-level firewall rules 152A (see 172) and PNIC-level firewall rules 154A (see 182) for comparison purposes, it should be understood that it is not necessary for Host-A 110A to apply VNIC-level firewall rules 152A for ingress packets when configured to apply PNIC-level firewall rules 154A instead.

Firewall Rule Aggregation

Some example firewall rules will be explained using FIG. 3, which is a schematic diagram illustrating example aggregation of VNIC-level firewall rules 152A to generate PNIC-level firewall rules 154A. In this example, three sets of VNIC-level firewall rules 310, 320, 330 forming VNIC-level firewall rules 152A in FIG. 1 are shown. First set 310 is configured for "VM1" 121 and applicable to ingress packets at "VNIC1" 131A. Similarly, second set 320 is configured for "VM2" 122 and applicable at "VNIC2" 132A, and third set 330 is configured for "VM3" 123 and applicable at "VNIC3" 133A.

In general, a firewall rule is specified in terms of multiple packet fields or data tuples, such as source Internet Protocol (IP) address, source port number (PN), destination IP address, destination port number and protocol. Any suitable protocol may be specified, such as Transmission Control Protocol (TCP), User Datagram Protocol (UDP), etc. An action is also specified, i.e., "PASS" to allow packets to pass through and "DROP" to block packets from passing through by dropping them. When applying a rule, the specified fields will be matched against corresponding fields of each ingress packet, and the action performed if there is a match.

In one example, "VM1" 121 and "VM2" 122 are configured to provide Hypertext Transfer Protocol (HTTP) services, while "VM3" 123 to provide HTTP Secure (HTTPS) services. In first set 310, rule 312 is applicable at "VNIC1" 131A to allow all ingress packets with destination IP address=IP-VM1 (i.e., IP address of "VM1" 121), destination PN=80 for HTTP and protocol=TCP. Otherwise, rule 314 will be enforced to drop the ingress packets. Similarly, in second set 320, rule 322 is applicable at "VNIC2" 132A to allow all ingress packets with destination IP address=IP-VM1 (i.e., IP address of "VM1" 121), destination PN=80 for HTTP and protocol=TCP. Otherwise, rule 324 is applicable. In third set 330, rule 332 is applicable at "VNIC3" 133A to allow ingress packets with destination IP address=IP-VM3 (i.e., IP address of "VM3" 123), destination PN=443 for HTTPS and protocol=TCP. Otherwise, rule 334 is applicable.

As explained using FIG. 1, VNIC-level firewall rules in sets 310, 320, 330 are conventionally applied at respective "VNIC1" 131A, "VNIC2" 132A and "VNIC3" 133A, which is less than ideal for host performance. According to example process 200 in FIG. 2, PNIC-level firewall rules 154A may be generated by analyzing and synthesizing VNIC-level firewall rules in sets 310, 320, 330. See also 340 in FIG. 3. For example, sets 310, 320, 330 may be analyzed to identify combinable packet fields, such as destination PN=80 and protocol=TCP in VNIC-level firewall rules 312 and 322 (both specifying action=PASS). Based on the combinable packet fields, VNIC-level firewall rules 312 and 322 are synthesized or merged to generate PNIC-level firewall rule 352.

Similarly, PNIC-level firewall rule 354 is generated based on corresponding VNIC-level firewall rules 332 (which cannot be synthesized with another rule) to allow ingress packets with destination IP address=IP-VM3, destination PN=443 and protocol=TCP to pass through. Based on VNIC-level firewall rules 314, 324 and 334, PNIC-level firewall rule 356 is generated to drop all other ingress packets that do not meet the requirements of either PNIC-level firewall rule 352 or 354.

It should be understood that generation operation (see 340 in FIG. 3) may be performed by Host-A 110A (e.g., using firewall engine 150A) or firewall controller 160, or both. In practice, PNIC-level firewall rule 514A may be generated automatically without necessitating any inputs from a user (e.g., network administrator). When performed by firewall controller 160, a control message specifying PNIC-level firewall rules 154A may be sent from firewall controller 160 to firewall engine 150A. In response to receiving the control message, firewall engine 150A is configured to apply PNIC-level firewall rules 154A to ingress packets at PNIC 114B instead of applying VNIC-level firewall rules 152A.

Figure 3:
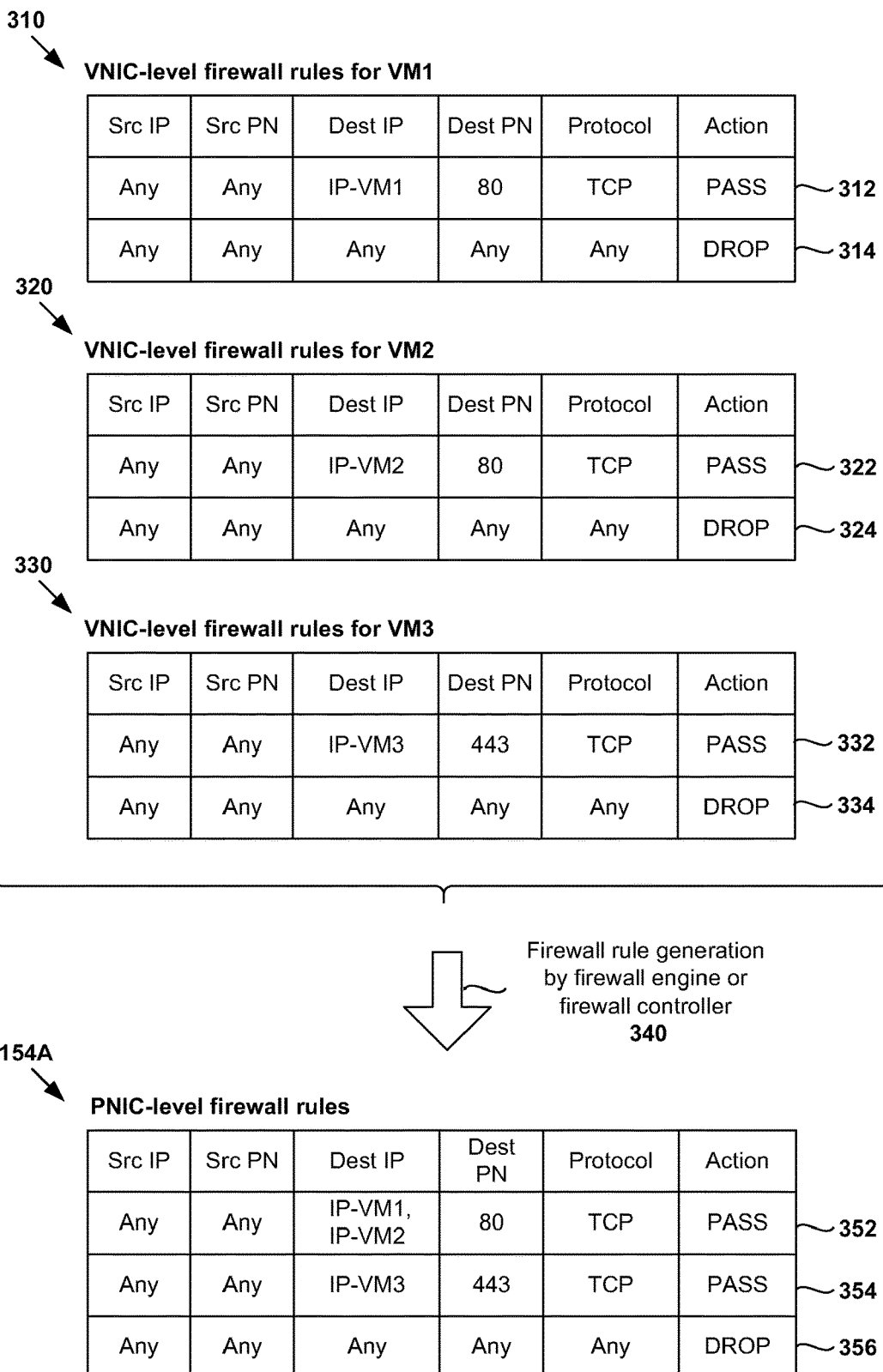
FIG. 3, which is a schematic diagram illustrating example aggregation of VNIC-level firewall rules to generate PNIC-level firewall rules.

It should be understood that block 210 in FIG. 2 and generation operation 340 in FIG. 3 may be performed on larger sets of, and more complex, VNIC-level firewall rules than that shown in FIG. 3. For example, in practice, source or destination IP address may be specified as an individual IP address, or a range of IP addresses specified as an IP Classless Inter-Domain Routing (CIDR) block. In general, the CIDR notation is a compact representation of an IP address and its associated routing prefix. The notation is constructed from the IP address and the prefix size, the latter being equivalent to the number of leading 1 bits in the routing prefix mask. The IP address is expressed according to the standards of IP version 4 (IPv4) or IP version 6 (IPv6), and followed by a separator character, the slash ('/') character, and the prefix size expressed as a decimal number. The IP address may denote a single, distinct interface address or the beginning address of an entire network.

For example, the IP CIDR block 192.168.100.0/24 specifies a routing prefix 192.168.100.0 and a subnet mask 255.255.255.0 (i.e., 24 leading 1-bits). In other words, the notation 192.168.100.0/24 represents a subnet that includes a range of address from 192.168.100.0 through 192.168.100.255. In some examples, an individual IP address can be regarded as a/32 CIDR block (i.e., having 1-bits for the entire subnet mask). IP-VM1 and IP-VM2 may each be an IP CIDR block, in which case operation 340 in FIG. 3 may include determining an IP CIDR block to covers both IP-VM1 and IP-VM2 to generate PNIC-level firewall rule 352. Also, generation operation 340 in FIG. 3 may further include determining a list of PNs, or range of PNs, by aggregating corresponding PNs specified by sets 310, 320 and 330. Any additional or alternative approaches may be used.

Destination-Associated Firewall Rules

Conventionally, firewall rules are configured for application at the destination host, which may not be ideal for host and network performance. As explained using FIG. 1, VNIC-level firewall rules 152A are applicable at "VNIC1" 131A, "VNIC2" 132A and "VNIC3" 133A of destination Host-A 110A. Although the application of PNIC-level firewall rules 154A to ingress packets detected at PNIC 114A reduces the processing burden of virtual switch 140A (compared to the conventional application of VNIC-level firewall rules 152A), source Host-B 110B still has to waste computing resources to process and send packets that will be eventually blocked by destination Host-A 110A. Further, network resources of physical network 102 are wasted to route the packets from source Host-B 110B to destination Host-A 110A.

Figure 4:
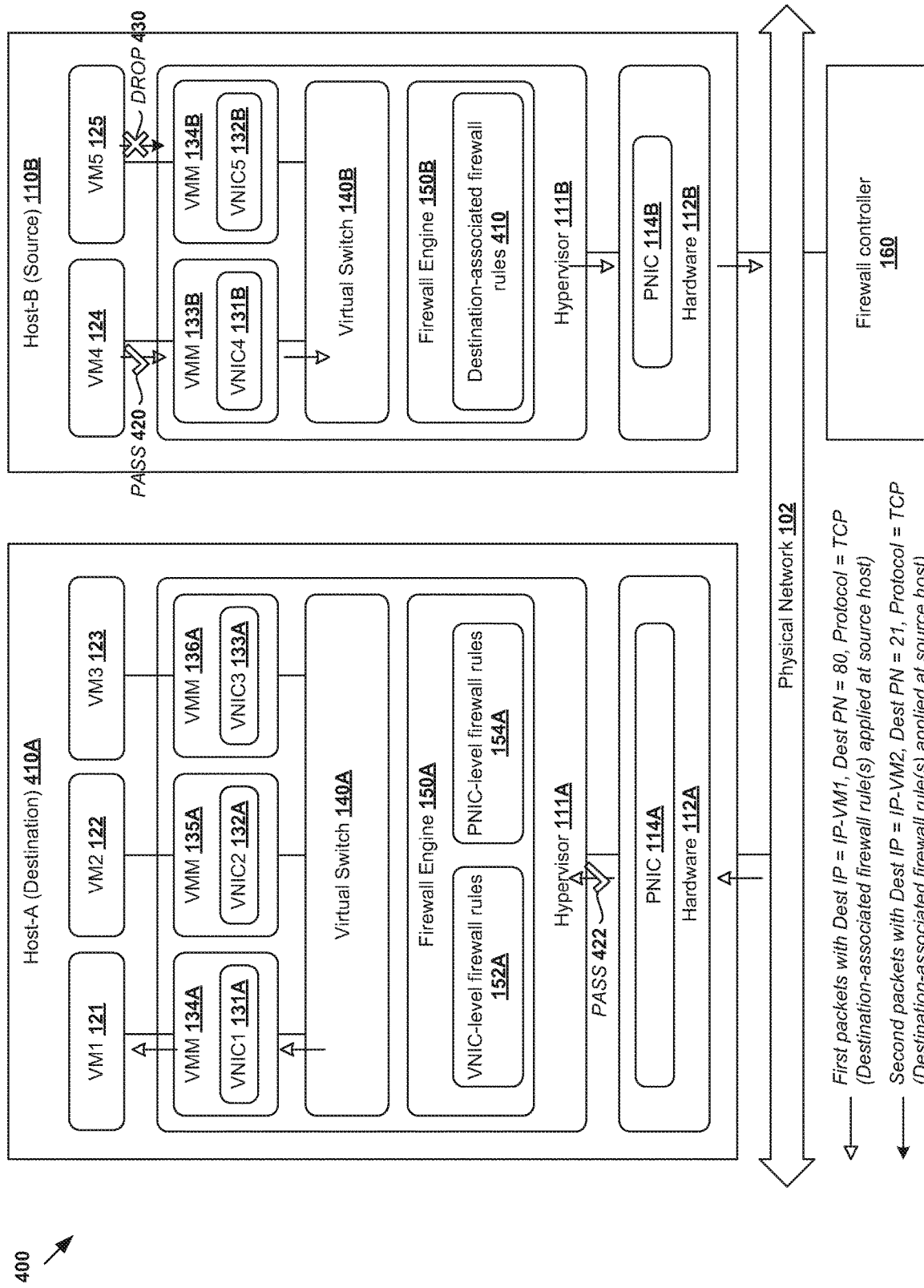
FIG. 4 is a schematic diagram illustrating example virtualized computing environment in which firewall is implemented according to a second example.

According to a second example of the present disclosure, host and network performance may be improved by configuring source Host-B 110B to drop egress packets that will be blocked by destination Host-A 110A. In more detail, FIG. 4 is a schematic diagram illustrating example virtualized computing environment 400 in which firewall is implemented according to a second example. The same reference numerals are used in FIG. 4 for components that are introduced in FIG. 1. It should be understood that virtualized computing environment 400 may include additional and/or alternative components than that shown, depending on the desired implementation.

In the example in FIG. 4, "destination-associated" firewall rules 410 are generated for source Host-B 110B based on VNIC-level firewall rules 152A or PNIC-level firewall rules 154A associated with destination Host-A 110A. As used herein, the term "destination-associated" may refer generally to firewall rules that are generated based on corresponding firewall rules that will be enforced at the destination. Before egress packets from "VM4" 124 and "VM5" 125 are sent via PNIC 114B, firewall engine 150B applies destination-associated firewall rules 410 to either allow the egress packets to pass through, or drop them. This reduces the processing burden on source Host-B 110B to process and send the unwanted packets, and prevents the unwanted packets from wasting the bandwidth of physical network 102.

For example in FIG. 4, firewall engine 150B allows egress packets sent by "VM4" 124 to "VM1" 121 (see 420 in FIG. 4) to pass through because the packets will be allowed (see 422 in FIG. 4) by firewall engine 150A at destination Host-A 110A according to firewall rule 312/352 in FIG. 3. In contrast, egress packets sent by "VM5" 125 to "VM2" 122 are dropped (see 430 in FIG. 4) by firewall engine 140B because the packets will be dropped by firewall engine 150A at destination Host-A 110A according to firewall rule 322/352 in FIG. 3.

Figure 5:
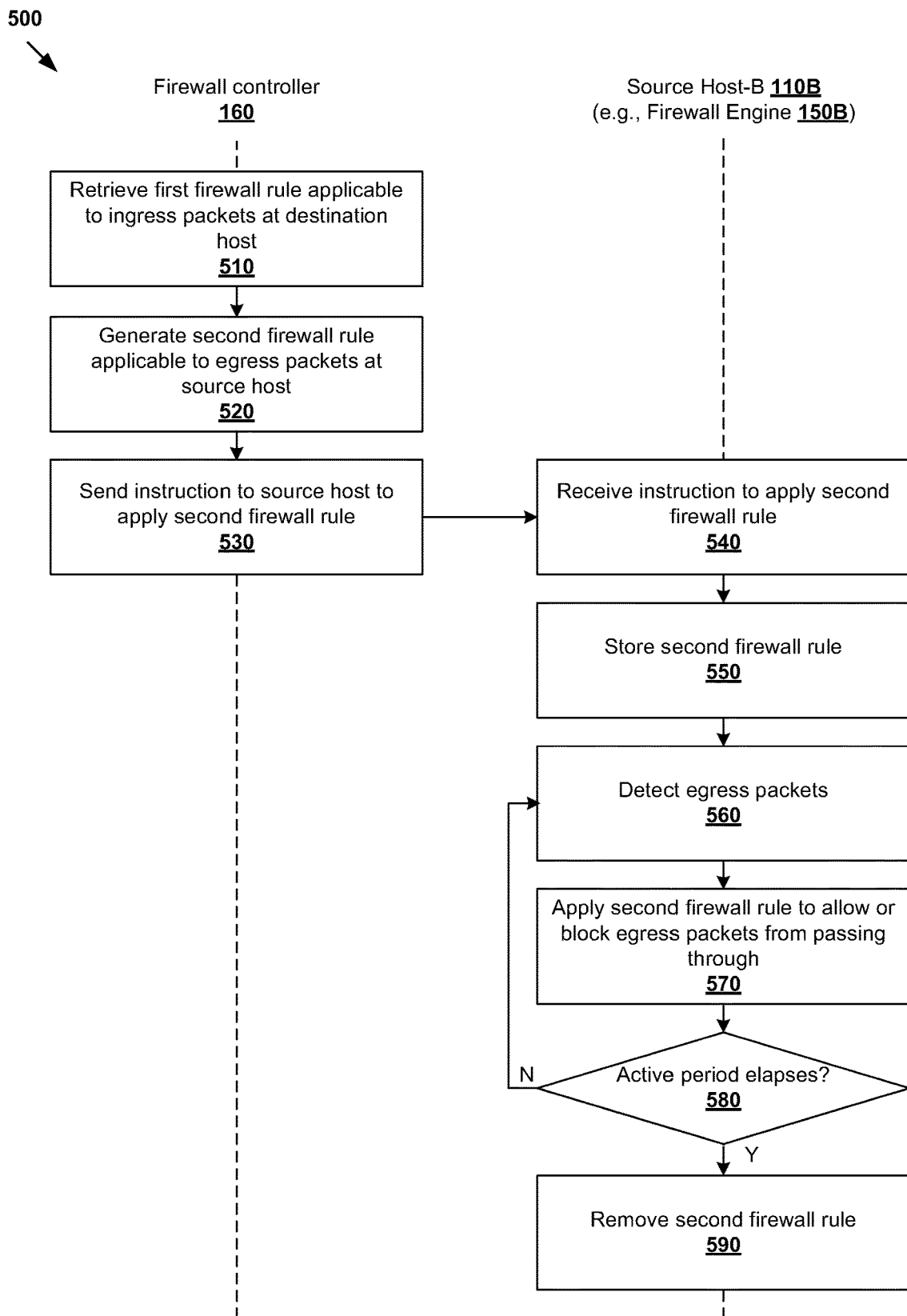
FIG. 5 is a flowchart of example process for a firewall controller to implement a distributed firewall in a virtualized computing instance.

In more detail, FIG. 5 is a flowchart of example process 500 for a firewall controller to implement a distributed firewall in a virtualized computing instance. Example process 500 may include one or more operations, functions, or actions illustrated by one or more blocks, such as 510 to 590. The various blocks may be combined into fewer blocks, divided into additional blocks, and/or eliminated depending on the desired implementation.

At 510 in FIG. 5, firewall controller 160 retrieves VNIC-level firewall rules 152A and PNIC-level firewall rules 154A (also referred to as "first firewall rules") that are applicable to ingress packets received by destination Host-A 110A. See FIG. 3 again for examples.

At 520 in FIG. 5, firewall controller 160 generates destination-associated firewall rules 410 (also referred to "second firewall rules") that are applicable at source Host-B 110B. Destination-associated firewall rules 410 are generated based on VNIC-level firewall rules 152A or PNIC-level firewall rules 154A that are applicable at destination Host-A 110A. As will be discussed further using FIG. 6A and FIG. 6B, destination-associated firewall rules 410 may be applied at a VNIC level or PNIC level. Application at the VNIC level is generally more efficient than that at the PNIC level because the egress packets will be, if necessary, dropped closer to the source virtual machine.

At 530 in FIG. 5, firewall controller 160 instructs source Host-B 110B to apply destination-associated firewall rules 410 to egress packets. For example, firewall controller 160 sends a control message to source Host-B 110B to instruct firewall engine 150B to monitor for egress packets and apply destination-associated firewall rules 410 to the egress packets.

At 540 and 550 in FIG. 5, firewall engine 150B receives the instruction (e.g., control message) from firewall controller 160 and stores destination-associated firewall rules 410. At 560 and 570 in FIG. 5, upon detecting egress packets from "VM4" 124 or "VM5" 125, firewall engine 150B applies one or more destination-associated firewall rules 410 to either allow the egress packets to be pass through, or drop the egress packets.

The number of destination-associated firewall rules 410 applicable at source Host-B 110B may be managed using any suitable approach. For example, firewall controller 160 or firewall engine 140B may assign an active period to each destination-associated firewall rule 410. In this case, at 570 and 580 in FIG. 5, firewall engine 140B removes a particular destination-associated firewall rule 410 after its active period has elapsed.

Using example process 500 in FIG. 5, VNIC-level firewall rules 152A or PNIC-level firewall rules 154A configured for destination Host-A 110A may be implemented "remotely" (i.e., remote to destination Host-A 110A) by configuring source Host-B 110B to implement corresponding destination-associated firewall rules 410. This allows remote firewall rule application to be implemented along with the distributed firewall architecture in virtualized computing environment 400 in FIG. 4.

Example Destination-Associated Firewall Rules

As will be discussed using FIG. 6A and FIG. 6B, destination-associated firewall rules 410 for source Host-B 110B may be generated based on (a) VNIC-level firewall rules 152A or (b) PNIC-level firewall rules 154A. Both will be explained using example first packets (see 420 in FIG. 4) from "VM4" 124 to "VM1" 121, and second packets (see 430 in FIG. 4) from "VM5" 125 to "VM2" 122.

(a) VNIC-Level Application

FIG. 6A is a schematic diagram illustrating example destination-associated firewall rules generated based on VNIC-level firewall rules 152A. In this example, destination-associated firewall rules 610, 620 may be generated by firewall controller 160 for application by firewall engine 150B at a VNIC level, i.e., when egress packets are detected at "VNIC4" 131B of "VM4" 124 or "VNIC5" 132B of "VM5" 125.

In more detail, at 610 in FIG. 6A, first set 610 may be applied to egress packets from source="VM4" 124 to destination="VM1" 121. Rule 612 in FIG. 6A is generated by reversing VNIC-level firewall rule 312 in FIG. 3 to drop egress packets with destination IP address=IP-VM1 and protocol=TCP, but destination PN≠80. Otherwise, the egress packets (e.g., with destination IP address=IP-VM1, destination PN=80 and protocol=TCP) will be allowed according to rule 614 in FIG. 6A.

In the example in FIG. 4, first packets 420 have the following fields: destination IP address=IP-VM2, destination PN=80 and protocol=TCP. Upon detecting first packets 420 at "VNIC4" 131B of source "VM4" 124, firewall engine 150B applies destination-associated firewall rule 614 to allow the packets to pass through and forwarded to destination "VM1" 121 via virtual switch 140B, PNIC 114B and physical network 102.

At 620 in FIG. 6A, second set 620 may be applied to egress packets from source="VM5" 125 to destination="VM2" 122. Similar to rule 612, rule 622 is generated by reversing VNIC-level firewall rule 322 in FIG. 3 to drop egress packets with destination IP address=IP-VM2 and protocol=TCP, but destination PN≠80. Otherwise, rule 624 allows the egress packets (i.e., with destination IP address=IP-VM2, destination PN=80 and protocol=TCP) to pass through and be forwarded to the destination.

In the example in FIG. 4, second packets 430 carry destination IP address=IP-VM2, destination PN=21 (i.e., not 80) and protocol=TCP. In this case, upon detecting second packets 430 at "VNIC5" 132B of source "VM5" 125, firewall engine 150B applies destination-associated firewall rule 622 to drop second packets 430, which would be blocked by corresponding VNIC-level firewall rule 322 in FIG. 3 had they been sent to destination Host-A 110A.

In the above examples, rules 612, 622 in FIG. 6A may be referred to as "reverse rules," each being generated by reversing corresponding rules 312, 314 in FIG. 3. Assuming that there will be many egress packets targeting the incorrect destination PN (i.e., ≠80), it would be more efficient for firewall engine 150B to apply reverse rules 612, 622 at source Host-B 110B to drop the egress packets. In contrast, if the rules in FIG. 3 are merely propagated from destination Host-A 110A and applied at source Host-B 110B, firewall engine 150B would have to first match the egress packets to rule 312/322 (not matched because of destination PN≠80) and then rule 314/324 to drop the egress packets.

(b) PNIC-Level Application

FIG. 6B is a schematic diagram illustrating example destination-associated firewall rules 630 generated based on PNIC-level firewall rules 154A. In this case, destination-associated firewall rules 630 may generated by firewall controller 160 for application by firewall engine 150B at a PNIC level, i.e., when egress packets are received via PNIC 114B. In the example in FIG. 4, the egress packets may originate from "VM4" 124 or "VM5" 125 and destined for "VM1" 121, "VM2" 122 or "VM3" 123.

In particular, rule 632 in FIG. 6B is generated based on PNIC-level firewall rule 352 in FIG. 3 to allow egress packets with destination IP address=IP-VM1 or IP-VM2, destination PN=80 and protocol=TCP. Similarly, rules 634 and 636 are the same as corresponding PNIC-level firewall rule 354 and 356 in FIG. 3. Firewall engine 150B may apply rules 632, 634 and 636 to allow or drop egress packets detected at PNIC 114B. In practice, PNIC-level firewall rules may be generated using any other suitable approach, such as by reversing PNIC-level firewall rules 352, 354 and 356 in FIG. 3.

Reactive and Proactive Modes

The generation of destination-associated firewall rules 410 according to blocks 510 to 530 may be performed according to a (a) reactive mode or (b) proactive mode that will be discussed below. In more detail, FIG. 7 a flowchart of example process 700 to generate destination-associated firewall rules according to reactive mode and proactive mode. Example process 700 may include one or more operations, functions, or actions illustrated by one or more blocks, such as 710 to 760. The various blocks may be combined into fewer blocks, divided into additional blocks, and/or eliminated depending on the desired implementation.

Figure 7:
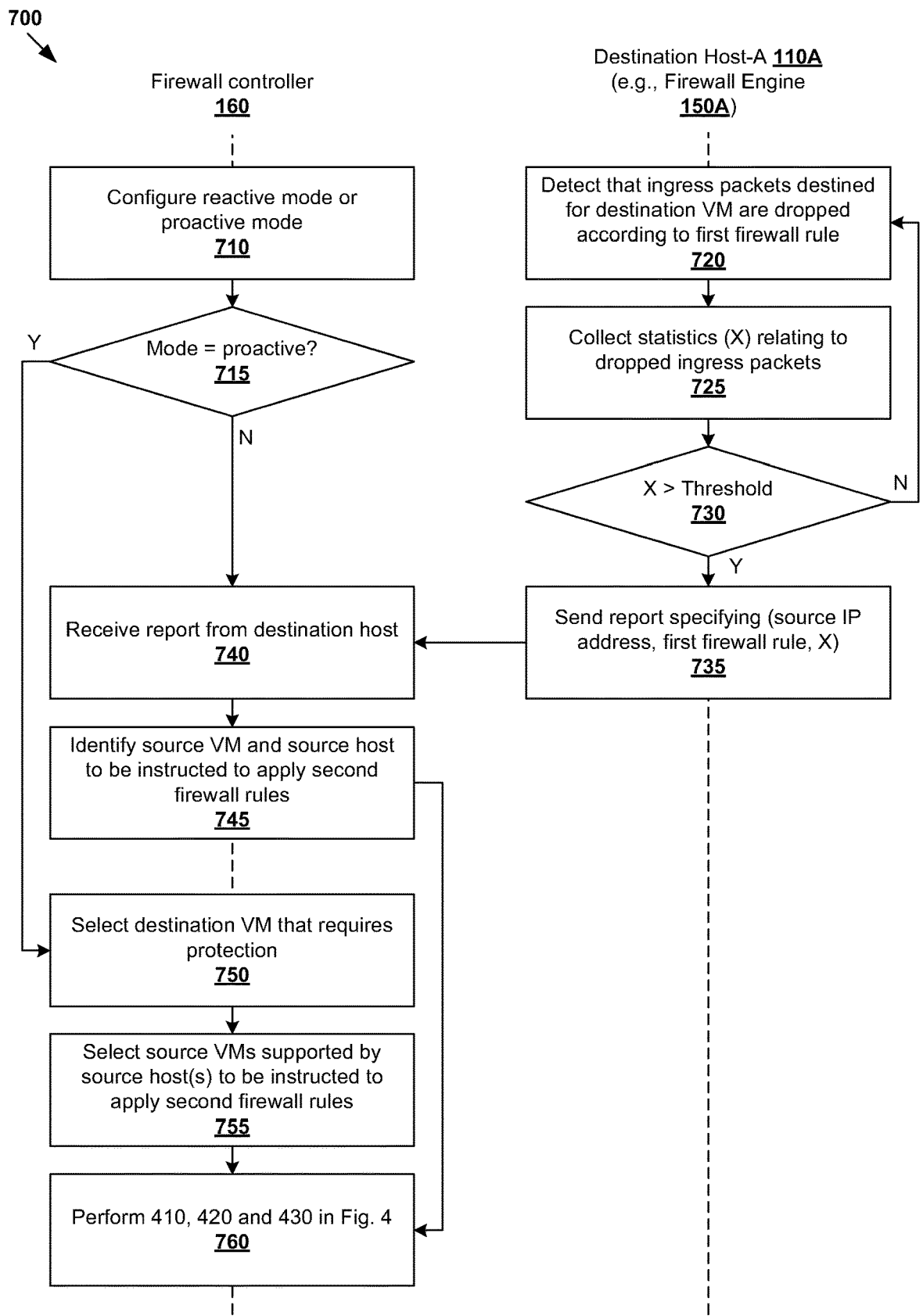
FIG. 7 a flowchart of example process to generate destination-associated firewall rules according to reactive mode and proactive mode.

At 710 in FIG. 7, firewall controller 160 is configured to operate in either reactive mode or proactive mode, such as based on input from a network administrator (not shown for simplicity). In one example, the reactive mode may be configured as the default mode. The proactive mode may be used as a precautionary measure to protect (important) destination virtual machines that receive a large number of ingress packets.

(a) Reactive Mode

According to the reactive mode, a statistics-based approach is used to trigger the generation of destination-associated firewall rules 410. For example in FIG. 4, before source Host-B 110B is instructed to apply destination-based firewall rules 410, destination Host-A 110A will drop packets from "VM5" 125 to "VM2" 122 because of the incorrect destination PN=21. In this case, at 710 and 720 in FIG. 7, firewall engine 150A at destination Host-A 110A collects statistics of the dropped packets. The "statistics" (represented using "X" in FIG. 7) may include any suitable numerical data, such as the number of dropped packets, a rate at which packets are dropped, etc.

At 730 and 740, in response to determination that the statistics (X) exceeds a threshold, firewall engine 150A sends a report message to firewall controller 160 identifying (source IP address=IP-VM5, firewall rule applied, X). The aim is to trigger firewall controller 160 to stop source Host-B 110B from sending those unwanted packets.

At 715 and 740 in FIG. 7, firewall controller 160 receives the report message from destination Host-A 110A. At 745 in FIG. 7, firewall controller 160 identifies source "VM5" 125 based on source IP address=IP-VM5, and corresponding source Host-B 110B. The identification at 745 may be based on mapping information between virtual machines and their respective IP addresses and hosts.

At 760 in FIG. 7, firewall controller 160 proceeds to destination-associated firewall rule generation according to blocks 410, 420 and 430 in FIG. 4, such as rule 622 in FIG. 6A or 632 in FIG. 6B. If the egress packets from "VM5" 125 to "VM2" 122 do not match the specified fields, they will be dropped and prevented from leaving source Host-B 110B.

(b) Proactive Mode

In contrast to the reactive mode, the proactive mode does not require any triggers or report messages from destination Host-A 110A. The proactive mode is suitable for protecting specialized virtual machines that receive a large number of ingress packets. For example in FIG. 4, "VM2" 122 may be a service virtual machine providing HTTP service to "VM4" 124 and "VM5" 125. In this case, firewall controller 160 may instruct firewall engine 150B to stop "VM4" 124 and "VM5" 125 from sending unwanted packets to "VM2" 122.

Compared to the reactive mode, the implementation of the proactive mode is more resource-intensive because there may be a large number of potential source virtual machines that send packets to "VM2" 122. As such, the proactive mode may be selectively implemented for important destination virtual machine or destination host (e.g., database server).

Referring to FIG. 7, at 750, firewall controller 160 selects destination virtual machine (e.g., "VM2" 122) that requires protection using destination-associated firewall rules. At 755 in FIG. 7, firewall controller 160 selects multiple source virtual machines (e.g., "VM4" 124 and "VMS" 125) supported by at least one source host (e.g., Host-B 110B) to be instructed to apply destination-associated firewall rules 410.

At 760 in FIG. 7, firewall controller 160 proceeds to firewall rule generation according to blocks 410, 420 and 430 in FIG. 4, resulting in destination-associated firewall rule 612/622 in FIG. 6A or 632 in FIG. 6B for example. If the egress packets from "VM4" 124 or "VM5" 125 to "VM2" 122 do not match the specified fields, they will be dropped and prevented from leaving source Host-B 110B.

Although examples of the reactive move and proactive mode have described using different source and destination hosts for simplicity, it should be understood that the same approach may be used when both the source virtual machine (e.g., "VM3" 123) and destination virtual machine (e.g., "VM2" 122) reside on the same Host-A 110A. In the case of reactive mode, firewall controller 160 may also instruct firewall engine 150A to stop "VM3" 123 from sending unwanted packets to "VM2" 122. In the case of proactive mode, firewall controller 160 may determine both "VM1" 121 and "VM3" 123 as potential sources, and instruct firewall engine 150A to stop them from sending unwanted packets to "VM2" 122.

Computing Devices

The above examples can be implemented by hardware (including hardware logic circuitry), software or firmware or a combination thereof. The above examples may be implemented by any suitable computing device, etc. The computing device may include processor(s), memory unit(s) and PNIC(s) that may communicate with each other via a communication bus, etc. The computing device may include a non-transitory computer-readable medium having stored thereon instructions that, when executed by the processor, cause the processor to perform processes described herein with reference to FIG. 1 to FIG. 7. For example, computing devices capable of acting as respective destination host (e.g., Host-A 110A), source host (e.g., Host-B 110B) and firewall controller 160 may be deployed in virtualized computing environment 100/400.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PFD1), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

I claim:

1. A method for a destination host to implement a firewall in a virtualized computing environment that includes the destination host and a source host, the method comprising:

receiving, via a physical network interface controller (PNIC) of the destination host, an ingress packet sent by the source host, wherein the ingress packet is addressed to a destination address, and a destination virtualized computing instance supported by the destination host is associated with the destination address and a destination virtual network interface controller (VNIC);

retrieving a PNIC-level firewall rule associated with the destination virtualized computing instance, wherein the PNIC-level firewall rule is applicable at the PNIC and generated based on a VNIC-level firewall rule applicable at the destination VNIC, and the VNIC-level firewall rule specifies a destination address field that matches with the destination address of the ingress packet; and in response to determination that the PNIC-level firewall rule blocks the ingress packet from passing through, dropping the ingress packet such that the ingress packet is not sent to the destination VNIC.

2. The method of claim 1, wherein the method further comprises:

generating the PNIC-level firewall rule by aggregating multiple VNIC-level firewall rules that include the VNIC-level firewall rule applicable at the destination VNIC.

3. The method of claim 2, wherein the generating the PNIC-level firewall rule comprises:
analyzing the VNIC-level firewall rule applicable at the destination VNIC and at least one other VNIC-level firewall rule to identify one or more combinable packet fields; and
based on the one or more combinable packet fields, synthesizing the VNIC-level firewall rule applicable at the destination VNIC and the at least one other VNIC-level firewall rule to generate the PNIC-level firewall rule.

4. The method of claim 3, wherein the packet fields include one or more of: source Internet Protocol (IP) address, source port number, destination IP address, destination protocol number, protocol and action.

5. The method of claim 1, wherein the destination host implements a distributed firewall engine that is configurable by a firewall controller and the method further comprises:
in response to receiving a control message from the firewall controller, configuring the firewall engine to apply the PNIC-level firewall rule at the PNIC instead of applying the VNIC-level firewall rule at the destination VNIC.

6. The method of claim 5, wherein the PNIC-level firewall rule specified in the control message is generated by the firewall controller by aggregating the multiple VNIC-level firewall rules.

7. A non-transitory computer-readable storage medium that includes a set of instructions which, in response to execution by a processor of a destination host, cause the processor to perform a method to implement a firewall in a virtualized computing environment that includes the destination host and a source host, the method comprising:
receiving, via a physical network interface controller (PNIC) of the destination host, an ingress packet sent by the source host, wherein the ingress packet is addressed to a destination address, and a destination virtualized computing instance supported by the destination host is associated with the destination address and a destination virtual network interface controller (VNIC);
retrieving a PNIC-level firewall rule associated with the destination virtualized computing instance, wherein the PNIC-level firewall rule is applicable at the PNIC and generated based on a VNIC-level firewall rule applicable at the destination VNIC, and the VNIC-level firewall rule specifies a destination address field that matches with the destination address of the ingress packet; and
in response to determination that the PNIC-level firewall rule blocks the ingress packet from passing through, dropping the ingress packet such that the ingress packet is not sent to the destination VNIC.

8. The non-transitory computer-readable storage medium of claim 7, wherein the method further comprises:
generating the PNIC-level firewall rule by aggregating multiple VNIC-level firewall rules that include the VNIC-level firewall rule applicable at the destination VNIC.

9. The non-transitory computer-readable storage medium of claim 8, wherein the generating the PNIC-level firewall rule comprises:

analyzing the VNIC-level firewall rule applicable at the destination VNIC and at least one other VNIC-level firewall rule to identify one or more combinable packet fields; and
based on the one or more combinable packet fields, synthesizing the VNIC-level firewall rule applicable at the destination VNIC and the at least one other VNIC-level firewall rule to generate the PNIC-level firewall rule.

10. The non-transitory computer-readable storage medium of claim 9, wherein the packet fields include one or more of: source Internet Protocol (IP) address, source port number, destination IP address, destination protocol number, protocol and action.

11. The non-transitory computer-readable storage medium of claim 7, wherein the destination host implements a distributed firewall engine that is configurable by a firewall controller and the method further comprises:
in response to receiving a control message from the firewall controller, configuring the firewall engine to apply the PNIC-level firewall rule at the PNIC instead of applying the VNIC-level firewall rule at the destination VNIC.

12. The non-transitory computer-readable storage medium of claim 11, wherein the PNIC-level firewall rule specified in the control message is generated by the firewall controller by aggregating multiple VNIC-level firewall rules.

13. A host, being a destination host, configured to implement a firewall in a virtualized computing environment that includes the destination host and a source host, comprising:
a processor;
a physical network interface controller (PNIC); and
a non-transitory computer-readable medium having stored thereon instructions that, when executed by the processor, cause the processor to:
receive, via the PNIC, an ingress packet sent by the source host, wherein the ingress packet addressed to a destination address, and a destination virtualized computing instance supported by the destination host is associated with the destination address and a destination virtual network interface controller (VNIC);
retrieve a PNIC-level firewall rule associated with the destination virtualized computing instance, wherein the PNIC-level firewall rule is applicable at the PNIC and generated based on a VNIC-level firewall rule applicable at the destination VNIC, and the VNIC-level firewall rule specifies a destination address field that matches with the destination address of the ingress packet; and
in response to determination that the PNIC-level firewall rule blocks the ingress packet from passing through, drop the ingress packet such that the ingress packet is not sent to the destination VNIC.

14. The host of claim 13, wherein the instructions further cause the processor to:
generate the PNIC-level firewall rule by aggregating multiple VNIC-level firewall rules.

15. The host of claim 14, wherein the instructions for generating the PNIC-level firewall rule cause the processor to:
analyze the VNIC-level firewall rule applicable at the destination VNIC and at least one other VNIC-level firewall rule to identify one or more combinable packet fields; and based on the one or more combinable packet fields, synthesize the VNIC-level firewall rule applicable at the destination VNIC and the at least one other VNIC-level firewall rule to generate the PNIC-level firewall rule.

16. The host of claim 15, wherein the packet fields include one or more of:
source Internet Protocol (IP) address, source port number, destination IP address, destination protocol number, protocol and action.

17. The host of claim 13, wherein the destination host implements a distributed firewall engine that is configurable by a firewall controller and the instructions further cause the processor to:
in response to receiving a control message from the firewall controller, configure the firewall engine to apply the PNIC-level firewall rule at the PNIC instead of applying the VNIC-level firewall rule at the destination VNIC.

18. The host of claim 17, wherein the PNIC-level firewall rule specified in the control message is generated by the firewall controller by aggregating multiple VNIC-level firewall rules.

* * * * *